United States Patent
Nandi et al.

(10) Patent No.: US 9,564,799 B2
(45) Date of Patent: Feb. 7, 2017

(54) CURRENT SENSORLESS CONTROL OF A BOOST-TYPE SWITCH MODE RECTIFIER (SMR) WITH INDUCTOR PARAMETER ADAPTATION

(71) Applicants: Subhasis Nandi, Victoria (CA); Adrian Engel, Remscheid (DE)

(72) Inventors: Subhasis Nandi, Victoria (CA); Adrian Engel, Remscheid (DE)

(73) Assignee: UVic Industry Partnerships Inc., Victoria (CA)

( * ) Notice: Subject to any disclaimer, the term of this patent is extended or adjusted under 35 U.S.C. 154(b) by 118 days.

(21) Appl. No.: 14/261,363

(22) Filed: Apr. 24, 2014

(65) Prior Publication Data
US 2015/0311788 A1    Oct. 29, 2015

(51) Int. Cl.
*H02M 3/156*    (2006.01)
*H02M 1/42*    (2007.01)
*H02M 1/00*    (2006.01)

(52) U.S. Cl.
CPC .......... *H02M 1/4225* (2013.01); *H02M 3/156* (2013.01); *H02M 2001/0009* (2013.01); *Y02B 70/126* (2013.01)

(58) Field of Classification Search
CPC ..... Y02B 70/126; H02M 3/156; H02M 3/158; H02M 3/1588; H02M 3/157; H02M 3/155; H02M 2003/1552; H02M 1/4225; H02M 2001/0009
See application file for complete search history.

(56) References Cited

U.S. PATENT DOCUMENTS

| 2006/0152204 A1* | 7/2006 | Maksimovic | H02M 1/38 323/284 |
| 2009/0267582 A1* | 10/2009 | Prodic | H02M 3/157 323/283 |

(Continued)

OTHER PUBLICATIONS

Athab et al., "A Simple Effective Duty Cycle Controller for High Power Factor Boost Rectifier," 7th International Conference on Power Electronics and Drive Systems, Bangkok, pp. 664-668 (2007).

(Continued)

*Primary Examiner* — Gustavo Rosario Benitez
(74) *Attorney, Agent, or Firm* — Klarquist Sparkman, LLP

(57) ABSTRACT

Boost-type switch-mode rectifiers (SMR) commonly use a resistor or a magnetic current sensor to measure the instantaneous input or inductor current that is used as the feedback to the current controller. A novel current sensorless scheme is described that computes the inductor current from the measured inductor voltage in a single-phase boost-type SMR using an adaptive low pass filter. This calculation requires an estimate of the inductance and the equivalent series resistance of the inductor coil. Both these parameters are dependent on operating conditions and are updated continuously. This is done using an adaptive model of the inductor that computes these parameters of the inductor once in every half cycle of the input current. The adaptation scheme is robust against parameter variations. Simulation and experimental results confirm the effectiveness of the proposed technique which provides comparable performance to standard measured feedback current scheme both under steady-state and transient conditions.

8 Claims, 14 Drawing Sheets

(56) References Cited

U.S. PATENT DOCUMENTS

| | | | | |
|---|---|---|---|---|
| 2011/0156687 A1* | 6/2011 | Gardner | | H02M 3/156 323/284 |
| 2012/0194161 A1* | 8/2012 | Latham, II | | H02M 3/156 323/286 |
| 2013/0049723 A1* | 2/2013 | Latham, II | | H02M 3/157 323/282 |
| 2013/0200869 A1* | 8/2013 | Sasao | | G05F 1/46 323/282 |
| 2014/0062440 A1* | 3/2014 | Garrett | | H02M 3/156 323/282 |
| 2015/0263603 A1* | 9/2015 | Pahlevaninezhad | | H02M 1/4208 363/17 |

OTHER PUBLICATIONS

Athab, H. S. and Lu, D. D.-C., "Simple controller for single-phase power factor correction rectifier," IET Power Electronics, 3:590-600 (Jul. 2010).
Azcondo et al., "Current Sensorless Power Factor Correction Based on Digital Current Rebuilding," Proc. of the Twenty-Fourth Annual IEEE Applied Power Electronics Conference and Exposition, pp. 774-779 (2009).
Azcondo et al., "Power Factor Correction without Current Sensor Based on Digital Current Rebuilding," IEEE Trans. on Power Electronics, 25:1527-1536 (2010).
Chen et al., "Current sensorless control for single-phase boost-type SMR," Proceedings of the Twenty-Third Annual IEEE Applied Power Electronics Conference and Exposition, pp. 1221-1226 (2008).
Chen, "Duty Phase Control for Single-Phase Boost-Type SMR," IEEE Transactions on Power Electronics, 23:1927-1934 (2008).
Chen et al., "Feedforward current control of boost single-phase PFC converters," IEEE Transactions on Power Electronics, 21:338-345 (Mar. 2004).
Chen et al., "Modeling and Small-Signal Analysis of a Switch-Mode Rectifier with Single-Loop Current Sensorless Control," IEEE Transactions on Power Electronics, 25:75-84 (2010).
Chen et al., "Modified Single-Loop Current Sensorless Control for Single-Phase Boost-Type SMR With Distorted Input Voltage," IEEE Transactions on Power Electronics, 26:1322-1328 (2011).
Chen, "Single-Loop Current Sensorless Control for Single-Phase Boost-Type SMR" IEEE Transactions on Power Electronics, 24:163-171 (2009).
Dixon "Average Current Mode Control of Switching Power Supplies," Unitrode Application Note U-140, http://www.ti.com/lit/an/slua079/slua079.pdf.
Finazzi et al., "Current-sensorless PFC Boost converter with preprogrammed control strategy," 2011 IEEE International Symposium on Industrial Electronics, Gdańsk, Poland, pp. 182-187 (2011).
Garcia et al, "Pre-calculated duty cycle control implemented in FPGA for power factor correction," 35th Annual Conference of IEEE Industrial Electronics, Porto, Portugal, pp. 2955-2960 (2009).
Kimball et al., "A current-sensorless digital controller for active power factor correction control based on Kalman filters," Proc. of the Twenty-Third Annual IEEE Applied Power Electronics Conference and Exposition, pp. 1328-1333 (2008).
Lenk, "Application Bulletin AB-20. Optimum Current Sensing Techniques in CPU Converters," (1998).
Lo et al. "Constant-frequency current slope control for single-phase switch-mode rectifiers without current sensors," Proc. of the 24th Annual Conference of the IEEE Industrial Electronics Society, 1:559-561 (1998).
Lo et al., "Constant-switching-frequency control of switch-mode rectifiers without current sensors," IEEE Transactions on Industrial Electronics, 47:1172-1174 (2000).
Lopez et al., "Autotuning digital controller for current sensorless power factor corrector stage in continuous conduction mode," Proceedings of the IEEE 12th Workshop Control and Modeling for Power Electronics, pp. 1-8 (2010).
Lukic et al., "Sensorless self-tuning digital CPM controller with multiple parameter estimation and thermal stress equalization," IEEE Trans. on Power Electronics, 26:3948-3962 (Dec. 2011).
Luo et al., "DCR current sensing technique for PFC circuits," Twenty-Third Annual IEEE Applied Power Electronics Conference and Exposition, pp. 1384-1388 (2008).
Merfert, "Analysis and application of a new control method for continuous-mode boost converters in power factor correction circuits," 28th Annual IEEE Power Electronics Specialists Conference, 1:96-102 (1997).
Merfert, "Stored-duty-ratio control for power factor correction," Proceedings of the Fourteenth Annual Applied Power Electronics Conference and Exposition, 2:1123-1129 (1999).
Micrometals, Inc., "Power Conversion & Line Filter Applications," Issue L, 2007, http://micrometals.com/pcparts/PC_L.pdf.
Ohnishi et al., "DC voltage and current sensorless single phase PFC converter," Proceedings of the IEEE 33rd Annual Power Electronics Specialists Conference, 3:1137-1142 (2002).
Ohnishi et al., "DC voltage sensorless single-phase PFC converter," IEEE Transactions on Power Electronics, 19:404-410 (2004).
Spectrum Digital Inc., eZdspF2812 Schematic, Rev. C, 2003, http://c2000.spectrumdigital.com/ezf2812/docs/ezf2812_schem.pdf.
Spectrum Digital Inc., eZdspF2812 Technical Reference, Rev. F, 2003, http://c2000.spectrumdigital.com/ezf2812/docs/ezf2812_techref.pdf.
Texas Instruments Inc. TMS320F2810, TMS320F2811, TMS320F2812, TMS320C2810, TMS320C2811, TMS320C2812 Digital Signal Processors. Data Manual, Rev. T, 2012, http://www.ti.com/litv/pdf/sprs174t.
Venable, "The K factor: A new mathematical tool for stability analysis and synthesis," Linear Technology Reference Reading, http://citeseerx.ist.psu.edu/viewdoc/download?doi=10.1.1.196.6850&rep=rep1&type=pdf.
Zhang et al., "A digital power factor correction (PFC) control strategy optimized for DSP," IEEE Transactions on Power Electronics, 19:1474-1485 (2004).
Ziegler et al., "Current Sensing Techniques: A Review," IEEE Sensors Journal, 9(4): 354-376 (2009).

* cited by examiner

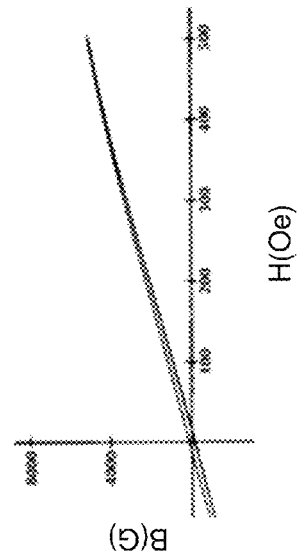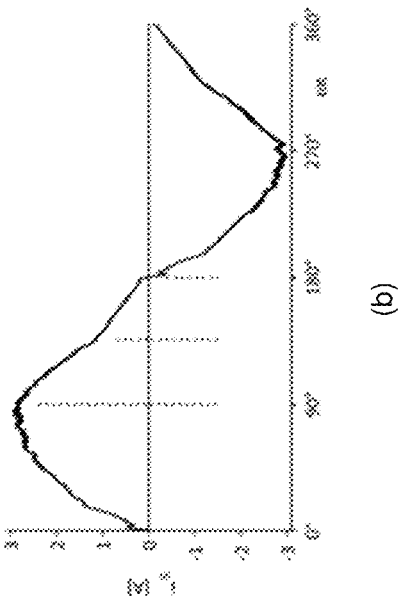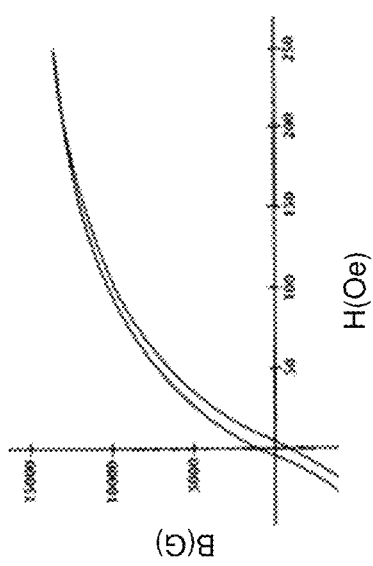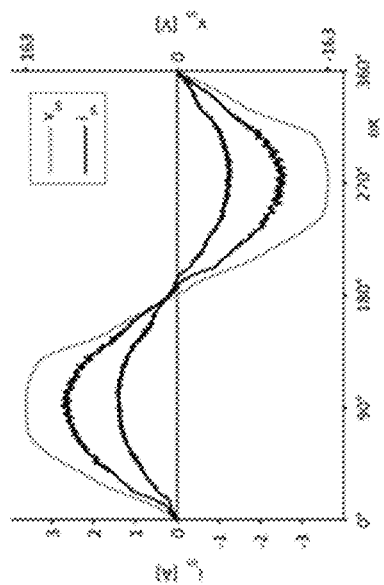
FIG. 10A
FIG. 10B
FIG. 11A
FIG. 11B

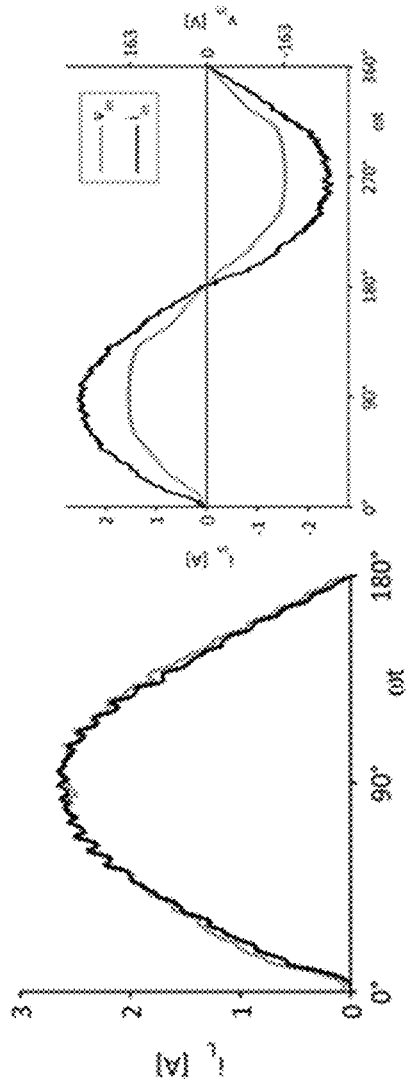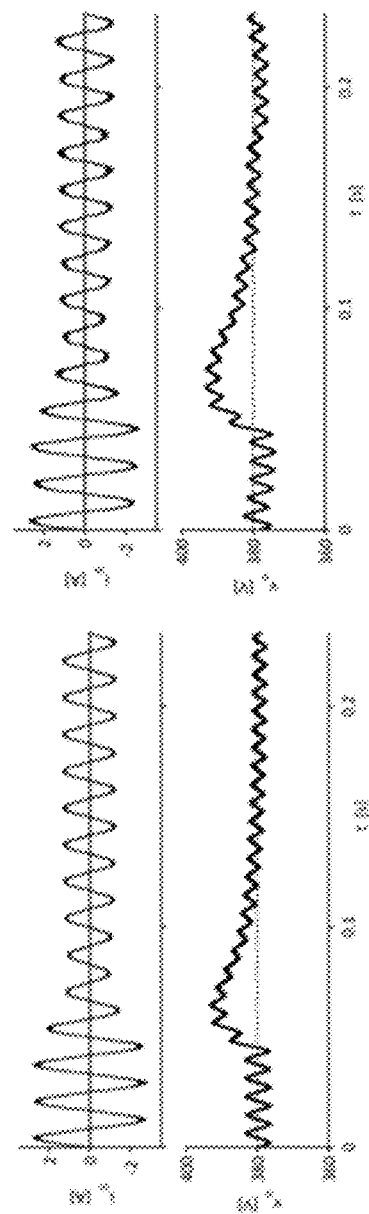
FIG. 12A  FIG. 12B  FIG. 13A  FIG. 13B

CURRENT SENSORLESS CONTROL OF A BOOST-TYPE SWITCH MODE RECTIFIER (SMR) WITH INDUCTOR PARAMETER ADAPTATION

FIELD

The disclosure pertains to the elimination of current sensing resistors in a boost type SMR by estimating the inductor current from the inductor voltage while keeping total harmonic distortion (THD) low and increasing the efficiency of the SMR by eliminating the current sensing resistor.

BACKGROUND

The classical control scheme for a typical switch-mode rectifier as shown in FIG. 1 employs two cascaded feedback control loops; the inner current loop for input current shaping and total harmonic distortion (THD) minimization and the outer voltage loop for output voltage regulation. For minimizing THD average current control is preferred. The inductor current which is used as the feedback signal for average current control is normally sensed using either a resistor in series with the inductor or a magnetic current sensing device such as Hall Effect based current sensor or regular current transformer. Resistor sensing is usually very straightforward, particularly in low power circuits, where the power dissipation in the sense resistor is negligible. However, in many applications, using a current sense resistor in the direct path of the current to be measured is not practical as not only a small value of sense resistor is difficult to implement, but also the power loss in the sense resistor is too high, particularly in large power converters. Also this sense resistor needs connection to the high voltage section of the circuit and hence isolation of the low voltage control circuit can become an issue. Hall Effect current sensors are reliable but suffer from dc offset, higher cost, temperature issues and the need to have a separate power supply. A single ferrite core current transformer (CT) cannot be directly used to sense the inductor current as it has a dc offset. To circumvent this problem two CTs can be used, one for sensing the switch current and one for sensing the diode current. By summing these two currents the true inductor current can be reconstructed [1]. Other options include copper trace resistance sensing with temperature compensation electronics, Rogowski coils, magneto resistance sensors and fiber-optic current sensors. Their applications are limited by isolation issues, high cost, size, incapability of measuring direct currents, low accuracy, or unsuitability for small currents [2,3].

From the above discussion it is clear that there is a need for an accurate, sensorless current measurement or estimation scheme. The vast body of literature related to research on sensorless current estimation techniques also confirms this viewpoint. They are briefly reviewed in the next few paragraphs.

In [4-6], the reference current is generated from input and output voltage without current sensing. The turn-off instant of the switch is calculated based on the maximum value of the reference current in a switching instant. The peak of the ramp carrier signal is proportional to the output dc voltage. The control law makes the peak current in each switching period follow $v_d$. The drive signal delay, sample and hold delays and measured voltage offset error can also be compensated. However compensation technique is utility voltage and load dependent and research is still required to make it tunable for any operating point. The scheme has been implemented using a field programmable gate array (FPGA).

Since under continuous conduction mode (CCM) the input-output relationship of a boost SMR is given by (1), it logically follows that varying a duty cycle, d, which is modulated because of the sinusoidal nature of the voltage waveform $v_d$, would essentially result in a sinusoidal input current; with the output voltage $V_o$ maintained constant by a closed loop controller. Thus researchers followed this lead and came up with many improved versions of this basic scheme [7-11] that add a term which is proportional to the derivative of $v_d$. This is because the derivative of the inductor current $i_L$ should be ideally proportional to the instantaneous values of $v_d$ as shown by (2). Following FIG. 1, the voltage across the boost inductor L, neglecting the series resistance $R_L$ can be written as (3). $v_Q$, the voltage across the switch Q can also be written in terms of the output voltage $V_o$ as (4). Substituting $i_L$ and $v_Q$ from (2) and (4) respectively in (3) one can obtain an improved version of (1) as shown in (5).

$$d = 1 - \frac{v_d}{V_o} \quad (1)$$

$$i_L = \kappa_1 \cdot v_d \quad (2)$$

$$L \frac{di_L}{dt} = v_d - v_Q \quad (3)$$

$$v_Q = (1-d)V_o \quad (4)$$

$$d = 1 - \frac{v_d}{V_o} + \frac{\kappa_2 L}{V_o} \frac{dv_d}{dt} \quad (5)$$

A further improved version of (5) includes the inductor equivalent series resistance, the voltage drop across the rectifier diodes, and also the drops across the switch and the diode in the boost converter [12]. References [13] and [14] sense only the input voltage to implement (5). Discrete time domain versions of (5) suitable for microcontroller implementation with or without compensating for circuit non-idealities using stored or computed duty cycle patterns have also been examined in [15-19].

A different approach is followed in [20-24] to achieve a current sensorless boost-type SMR. The voltage loop output in the form of a phase angle α, is used to control the output voltage along with the shape of the input current, as given by (6). Compensation for circuit non-idealities such as inductor resistance and device drops are also possible. While most of them are single loop, a two loop implementation, with one loop for phase angle and one for mean output voltage control through real power control; using Kalman filters have been implemented [23].

$$d = 1 - \frac{\hat{v}_d}{v_0}|\sin(\theta - \alpha)|;\ v_d = \hat{v}_d|\sin(\theta)| \quad (6)$$

TABLE I

Prior-art in the area of current sensorless control of single phase boost-type SMR.

| | [7] | | [10] | | [13] | [15] | | | | | [21] | | | |
| | [4-6] | [8] | [9] | [11] | [12] | [14] | [16] | [17] | [18] | [19] | [20] | [22] | [23] | [24] | [25] |
|---|---|---|---|---|---|---|---|---|---|---|---|---|---|---|---|
| Takes circuit non-idealities in to account | No | No | No | No | Yes | No | No | Yes | No | No | No | Yes | No | Yes | No |
| Proven to be insensitive to parameter variation | Yes[1] | No | Yes[2] | No | No | No | No | No | No | No | No | Yes[3] | No | Yes[4] | No |

[1]Not verified with experimental results.
[2]Analyzed input admittance for inductance variations.
[3]Experimental results have been obtained with non-nominal inductance and capacitance.
[4]Detailed experimental results have been provided on parameter variation.

In [25], the current is indirectly measured by connecting a capacitor in series with a resistor across the boost inductor. If $v_{C_s}(s)$ and $i_L(s)$ are respectively the capacitor voltage and inductor current in frequency domain, it can be shown that $$\frac{v_{C_s}(s)}{i_L(s)} = \frac{R_L + sL}{1 + sR_{C_s}C_s} = R_L \frac{1 + s\frac{L}{R_L}}{1 + sR_{C_s}C} = R_L \frac{1 + s\tau_L}{1 + s\tau_C} \quad (7)$$

where $R_L$, $R_{C_s}$ are respectively the equivalent series resistance of the boost inductor L and the external resistor connected in series with the current sense capacitor $C_s$. If $\tau_C = R_{C_s}C_s$ is chosen so that it matches $$\tau_L = \frac{L}{R_L},$$

the relation $$\frac{v_{C_s}}{i_L}$$

becomes frequency independent, signifying that the sensing preserves the shape of the inductor current. Under this condition, $v_{C_s}$ is proportional to the inductor current and therefore can be used in the current control loop. Obviously, the technique is load dependent as both the inductor resistance and the inductor value are influenced by the inductor current. Reference [26] presents a similar technique applied to a dc-dc buck converter using a self-tuning digital filter whose parameters are tuned using a test current sink, consisting of a known resistor in series with a small switch, in parallel with the load. Table I summarizes the prior art in the area of current sensorless control of single phase boost-type SMR.

SUMMARY

In the disclosed examples, power supply control can be provided without current sensors in the form of resistors or Hall Effect current sensors. Steady state and transient performance can be achieve that is comparable to schemes with sensed current by estimating the current from the inductor voltage and minimizing (or reducing) the current THD by a robust inductor parameter estimation technique.

In typical examples, digital power supply controllers comprise a logic device, having computer executable instructions defined therein for performing a control method that includes receiving a measurement corresponding to a switch voltage associated with a switch device and a measurement of a rectified input voltage. Based on the switch voltage and the rectified input voltage, a resistance and an inductance of a boost inductor are estimated. A current in the inductance is estimated based on the estimated resistance and inductance, and a power control signal is obtained based on the estimated current.

The foregoing and other features, and advantages of the invention will become more apparent from the following detailed description, which proceeds with reference to the accompanying figures.

BRIEF DESCRIPTION OF THE DRAWINGS

FIGS. 10A-10B illustrate B-H curve for type 40 material and type 2D material, respectively.

FIGS. 11A-11B illustrate actual input current $i_{in}$ at full-load and half-load and input voltage $v_{in}$ when measured current was used for current feedback, actual input current when computed current was used for current feedback. Type 40 core material was used for the inductor, respectively. $L^{imp}=11$ mH, $R_L^{imp}=0.6\Omega$.

FIGS. 12A-12B illustrate measured (grey) and computed (black) inductor current when the computed current is used for the current control with improved (type 2D material) inductor design at rated load, and actual input current $i_{in}$ at full-load and input voltage $v_{in}$ when the computed current was used for current feedback with the improved inductor, respectively. $L^{imp}=6.5$ mH, $R_L^{imp}=1.0\Omega$.

FIGS. 13A-13B illustrate step change from full load to half load with measured current feedback, and computed current feedback using the improved inductor, respectively.

DETAILED DESCRIPTION

Figure 1:
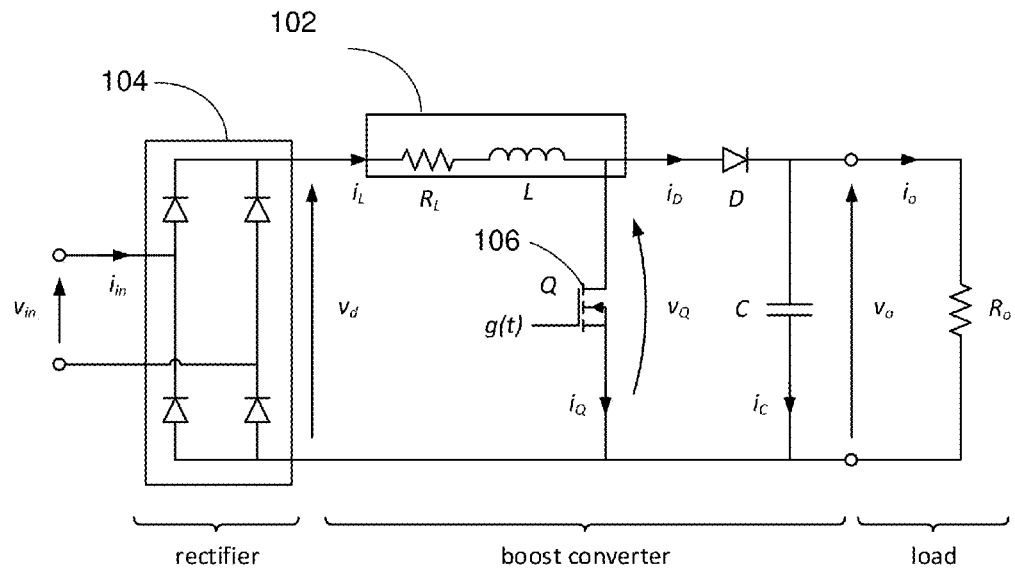
FIG. 1 illustrates a single-phase SMR.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

The disclosed methods and apparatus can be implemented in a variety of hardware devices, referred to herein as logic devices. Typical examples in programmable logic devices (PLDs) such as complex PLDs that can implemented as series of interconnected PLDs. In some examples, the disclosed methods are transferred to the devices after incorporation with other power supply or power control hardware. Other examples include field-programmable gate arrays (FPGAs). In some cases, computer-executable instructions for implementing the disclosed methods are stored in a PROM, EEPROM, or other ROM, or other volatile or non-volatile memory for transfer to a PLD or FPGA. In other examples, ASICs or other devices (including computer CPUs, systems on a chip (SOC), or other hardware is used. These devices are referred to for convenience as logic devices, and the disclosed approaches permit digital power control based on executable instructions implement using one or more logic devices.

In some examples, voltages are directly measured but such measured voltages also refer to voltages derived from resistive or other divider networks.

In the disclosed examples, methods and apparatus that implement novel, non-obvious approaches to estimating inductor current in switching power supplies are described. As discussed above, inductor current can be indirectly measured by connecting a capacitor in series with a resistor across a boost inductor. If $v_{C_s}(s)$ and $i_L(s)$ are respectively the capacitor voltage and inductor current in frequency domain, it can be shown that $$\frac{v_{C_s}(s)}{i_L(s)} = \frac{R_L + sL}{1 + sR_{C_s}C_s} = R_L \frac{1 + s\frac{L}{R_L}}{1 + sR_{C_s}C} = R_L \frac{1 + s\tau_L}{1 + s\tau_C} \quad (7)$$

wherein $R_L$, $R_{C_s}$ are respectively the equivalent series resistance of the boost inductor L and the external resistor connected in series with the current sense capacitor $C_s$. If $\tau_C = R_{C_s}C_s$ is chosen so that it matches $$\tau_L = \frac{L}{R_L},$$

the relation $$\frac{v_{C_s}}{i_L}$$

becomes frequency independent, signifying that the sensing preserves the shape of the inductor current. Under this condition, $v_{C_s}$ is proportional to the inductor current and therefore can be used in the current control loop. This technique is load dependent as both the inductor resistance and the inductor value are influenced by the inductor current. A similar approach can be applied to a dc-dc buck converter using a self-tuning digital filter whose parameters are tuned using a test current sink, consisting of a known resistor in series with a small switch, in parallel with the load.

However, as disclosed herein, parameters of a low pass filter used to estimate the inductor current can be determined without using any extra components, but can be tuned continuously using a readily implementable approach. Referring to FIG. 1A, an inductor 102 (referred to in some cases as a "boost" inductor and shown in FIG. 1A as a series resistance/inductance combination) is coupled to a rectifier 104, shown as a full wave bridge. The rectifier 104 receives an input voltage/current and produces an input rectified voltage $v_d$. As shown in FIG. 1, a voltage across the inductor L is obtained first by subtracting the switch voltage $v_Q$ from the input rectified voltage $v_d$. The switch voltage is controlled based on the control device 106, shown as a FET in FIG. 1. This inductor voltage is then passed through an adaptive low pass filter, employing the inductor's tuned resistance and inductance values as parameters to obtain the inductor current. These parameters can be continuously or periodically estimated and adapted through a scheme so as to make the current control robust against parameter variation. When these updated values are used to compute the inductor current it shows significant improvement in THD. The performance of the current sensorless scheme is comparable to the measured current scheme both under steady state and transient conditions. These results are confirmed through simulation and experimentation.

This new approach can be used to eliminate or reduce problems associated with conventional methods to sense current. Current sensing with a resistor is associated with problems such as isolation, noise immunity and power loss, especially in high power converters. Current sensing with a Hall Effect sensor is typically associated with high cost and dc offset. Conventional current sensorless schemes suffer from the lack of parameter estimation. With the disclosed approaches, parameters can be estimated and estimation errors can be compensated through closed loop control.

One commercially important example pertains to boost-type SMRs as they are widely used as front end to dc to dc, ac-dc converters, motors drives.

A. Estimation of Inductor Current

Figure 2A:
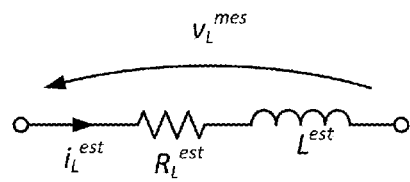
FIGS. 2A-2B illustrate an inductor model and estimation of inductor current, respectively.
Figure 2B:
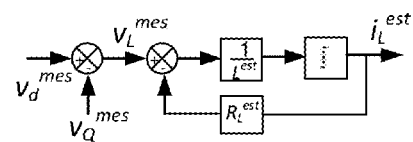

Since the measured inductor current as feedback signal for the current control loop is not available, it was estimated in the following way. First the inductor's inductance and its equivalent series resistance are modeled as shown in FIG. 2A, The estimated current $i_L^{est}$ can be obtained by solving (8) in real time as shown in FIG. 2B. The inductor voltage $v_L^{mes}$ is obtained by subtracting $v_Q^{mes}$ from $v_d^{mes}$, the measured values of $v_d$ from $v_Q$, as shown in (9). $v_d^{mes}$ and $v_Q^{mes}$ can be acquired by inexpensive resistive networks. To avoid integration offset, the integrator is reset at every zero crossing of the input AC voltage $v_{in}$.

$$v_L^{mes} = R_L^{est} \cdot i_L^{est} + L^{est} \frac{d i_L^{est}}{dt} \tag{8}$$

$$v_L^{mes} = v_d^{mes} - v_Q^{mes} \tag{9}$$

B. Estimation of Inductor Parameters

Figure 3:
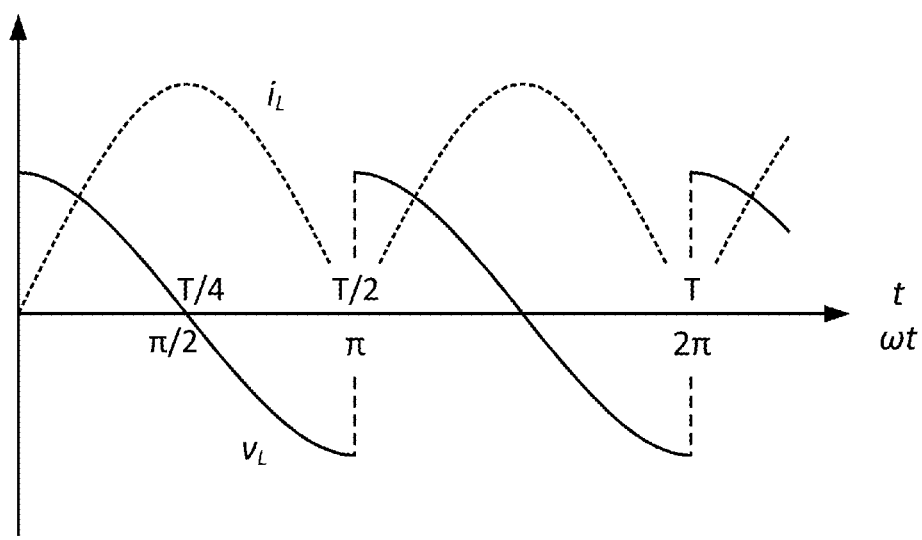
FIG. 3 illustrates an ideal inductor current $i_L$ and inductor voltage $v_L$.

Assuming ideal inductor current, voltage and parameters, (8) can be rewritten in the generic form following FIG. 3 as $$v_L = R_L i_L + L \frac{d i_L}{dt}; 0 \le \omega t \le \pi \tag{10}$$

wherein $$i_L = \hat{I}_L \sin \omega t \tag{11}$$

and where $\omega$ is the frequency of $v_{in}$ rad./s. and $\hat{I}_L$ is the peak of the inductor current. Differentiating (11) yields $$\frac{d i_L}{dt} = \hat{I}_L \omega \cos \omega t \tag{12}$$

Integrating (10) by substituting (11) and (12) in (10) over two instants $t_1$, $t_2$, yields $$\int_{t_1}^{t_2} v_L dt = R_L \hat{I}_L \frac{1}{\omega} (\cos \omega t_1 - \cos \omega t_2) + L\hat{I}_L (\sin \omega t_2 - \sin \omega t_1); \tag{13}$$

$$t_1, t_2 \in \left[0, \frac{\pi}{\omega}\right]$$

Then with $$t_1 = 0 \text{ and } t_2 = \frac{T}{2} = \frac{\pi}{\omega}$$

$$\int_{t_1}^{t_2} v_L dt = \int_0^{\frac{T}{2}} v_L dt = 2 R_L \hat{I}_L \frac{1}{\omega} \tag{14}$$

and with $$t_1 = 0, t_2 = \frac{T}{4} = \frac{\pi}{2\omega}$$

$$\int_{t_1}^{t_2} v_L dt = \int_0^{\frac{T}{4}} v_L dt = R_L \hat{I}_L \frac{1}{\omega} + L\hat{I}_L \tag{15}$$

Since $v_L$ and hence $\int_{t_1}^{t_2} v_L \, dt$ can be measured, L and $R_L$ can be found out using (14) and (15) provided $\hat{I}_L$ is known. An estimate of $\hat{I}_L$ can be obtained from the output voltage ripple [27] as follows. Since $$v_{0,rip} \approx \frac{1}{C} \int i_C dt = -\frac{I_0}{2\omega C} \sin 2\omega t \tag{16}$$

and $$I_0 = \frac{\hat{V}_d \hat{I}_L}{2 V_0} \tag{17}$$

an estimate of $\hat{I}_L$ can be made from (16) and (17). Here $\hat{V}_d$ is the peak of $v_d$, and $V_0$ and $I_0$ are the mean values of output dc voltage and load current, respectively. If $\hat{V}_{0,rip}$ is the peak of the output voltage ripple, then using (16) an estimate of $\hat{I}_L$ can be found, using the nominal value $C^{nom}$ of C, as $$\hat{I}_L^{est} = 4\omega C^{nom} \cdot \frac{V_o^{mes}}{\hat{V}_d^{mes}} \cdot \hat{V}_{o,rip}^{mes} \quad (18)$$

Thus finally the estimates $R_L^{est}$ and $L^{est}$ for $R_L$ and $L$ are evaluated using (14), (15) and (18) as $$R_L^{est} = \frac{\omega}{2\hat{I}_L^{est}} \int_0^{T/2} v_L^{mes} dt \quad (19)$$

$$L^{est} = \frac{1}{\hat{I}_L^{est}} \left[ \int_0^{T/4} v_L^{mes} dt - \frac{1}{2} \int_0^{T/2} v_L^{mes} dt \right] \quad (20)$$

It is to be noted that although (18) and hence (19) and (20) are dependent on the actual value of C, it is corrected by the feedback mechanism of the voltage control loop in the following way. Equation (8) can be written in the Laplace domain as $$i_L^{est}(s) = \frac{1}{L^{est}} \frac{1}{\left(s + \frac{R_L^{est}}{L^{est}}\right)} v_L^{mes}(s) \quad (21)$$

Since the term $\hat{I}_L^{est}$ cancels out in the computation of $$\frac{R_L^{est}}{L^{est}},$$

only the gain $$\frac{1}{L^{est}}$$

is affected by $\hat{I}_L^{est}$ in (21). However the voltage control loop compensator structure is such that it will suitably adjust its gain in order to make $i_L^{est}(s)$ equal to $i_L^{ref}(s)$ which is the product of the rectifier output voltage $v_d$ and the output of the voltage controller κ. The concept is further explained and validated in the next section. It will be apparent that other time intervals can be selected for performing the above estimates, but intervals of [0, π/4ω] and [0, π/2ω] are convenient.

C. Simulation Results

A 200 W, 120 Vrms, 60 Hz input, 380V DC output, 20 kHz switching frequency converter, the details of which are given in the Appendix, was first simulated using the proposed technique to prove the concept. MATLAB/SIMULINK based SimPowerSystems toolbox was used for the simulation. Standard state-space averaging technique was used following [27] to model the plant transfer functions of the converter for both the current loop and the voltage loop. Both the current controller and the voltage controller is Type II [28] and are of the form as shown in (22).

$$G_c(s) = K \frac{s + \omega_z}{s(s + \omega_p)} \quad (22)$$

The open loop crossover frequency of the current loop and the voltage loop were chosen to be 3183 Hz (that is $$\frac{1}{2\pi}$$

or switching frequency) and 10 Hz (for a good compromise between current harmonic content and transient response) respectively, based on standard design practice. Because of the pole at zero frequency in the controller, the steady state dc error is zero. This is the reason why the estimation of $$\frac{1}{L^{est}}$$

is corrected by the voltage feedback controller despite inaccuracies in computation of $\hat{I}_L^{est}$ and hence $L^{est}$ due to capacitor tolerance. This is verified later in this section using simulation results.

Figure 4:
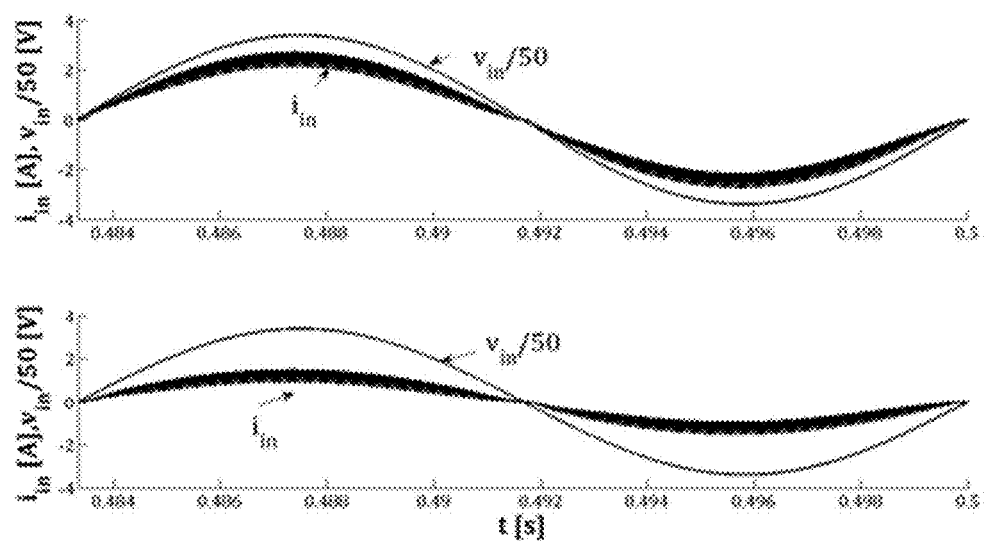
FIG. 4 illustrates input voltage and current under full-load (top) and half-load (bottom). The voltage waveform has been scaled to 1/50 of its original value.

FIG. 4 shows the input voltage and input current of the simulated converter under half load and full load condition with L=8 mH and $R_L$=0.6Ω (these parameters values were used for both the inductor and controller) with sensorless current control. Table II shows the individual current harmonics and the THD (for 1 s current data and including harmonics up to nearly 500 kHz). It is very clear that the scheme produces high quality input current although no capacitor was included at the output of the rectifier in simulation.

Figure 5A:
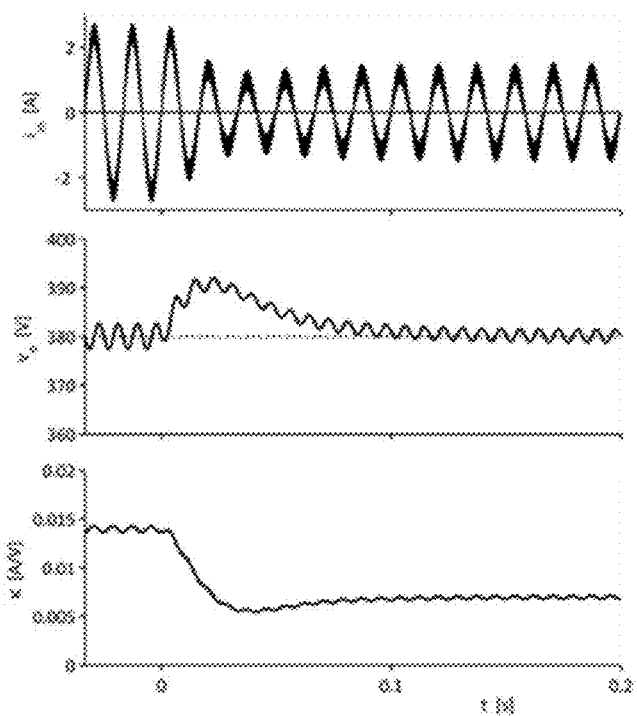
FIGS. 5A-5B illustrate input current ($i_{in}$), the output voltage ($v_o$) and the output of the voltage controller (κ) when the load was changed from 100% to 50% and 50% to 100%, respectively.
Figure 5B:
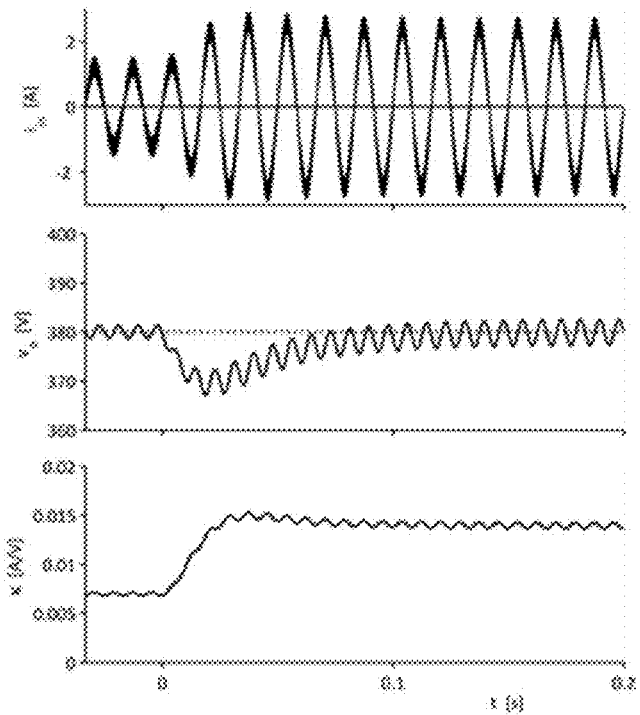
Figure 6:
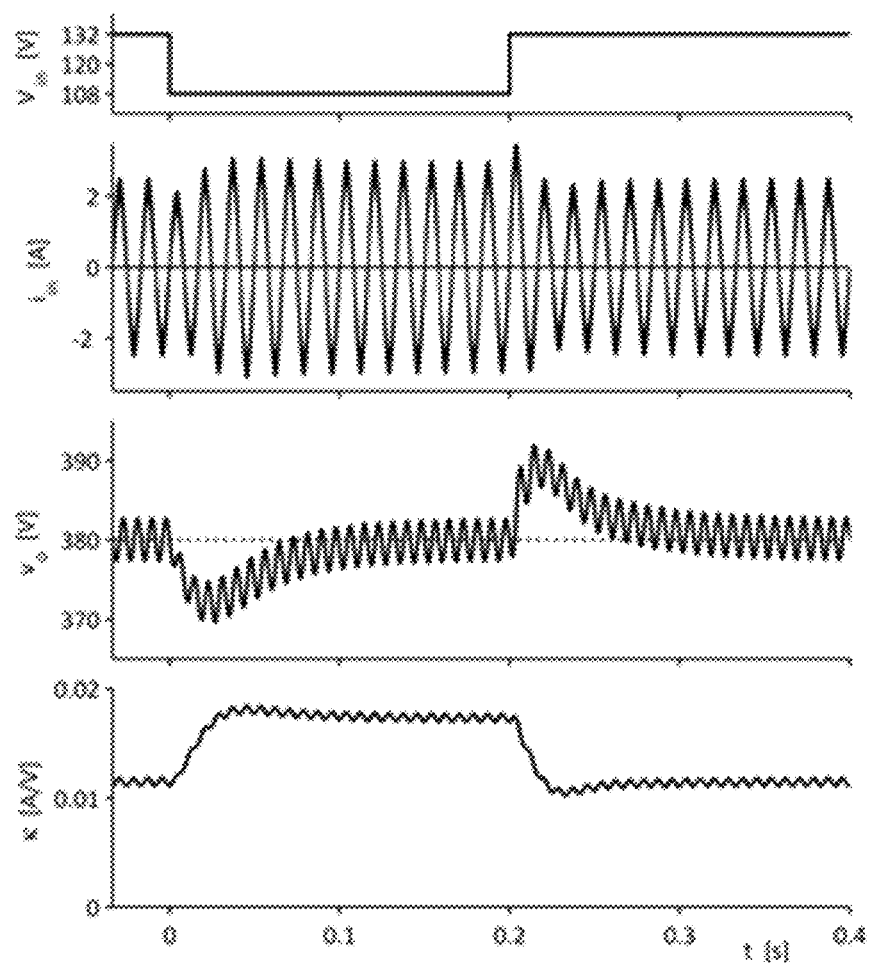
FIG. 6 illustrates RMS value of input voltage ($V_{in}$), input current ($i_{in}$), the output voltage ($v_o$) and the output of the voltage controller (κ) when the RMS value of input voltage ($V_{in}$) was changed from 132 V to 108 V and again from 108 V to 132 V.

FIG. 5 shows the input current ($i_{in}$), the output voltage ($v_o$) and the output of the voltage controller (κ) when the load was changed from 100% to 50% and 50% to 100% respectively. FIG. 6 shows the input current, the output voltage and the output of the voltage controller when the RMS value of the input voltage ($v_{in}$), which is nominally 120 V RMS, is changed from 132 V RMS to 108 V RMS and then back again to 132 V RMS. The same parameter values as used under the steady state condition were used for both the boost inductor and the controller. Although no feedforward control schemes were used the performance of the converter even under transient conditions with sensorless current control is quite satisfactory.

TABLE II

Simulation results. RMS values of the low-order harmonics of the input current in mA and its total harmonic distortion for different output powers (100%, 75%, 50% and 25% of rated load).

| $P_o$ | $I_{in(1)}$ | $I_{in(3)}$ | $I_{in(5)}$ | $I_{in(7)}$ | $I_{in(9)}$ | $I_{in(11)}$ | THD |
|---|---|---|---|---|---|---|---|
| 200 W | 1699 | 27.5 | 10.7 | 9.8 | 8.8 | 7.9 | 2.3% |
| 150 W | 1274 | 23.1 | 10.5 | 9.4 | 8.2 | 7.2 | 2.7% |
| 100 W | 852 | 19.1 | 10.6 | 9.1 | 7.7 | 6.2 | 3.5% |
| 50 W | 431 | 17.1 | 11.4 | 8.7 | 6.2 | 4.2 | 6.4% |

Figure 7A:
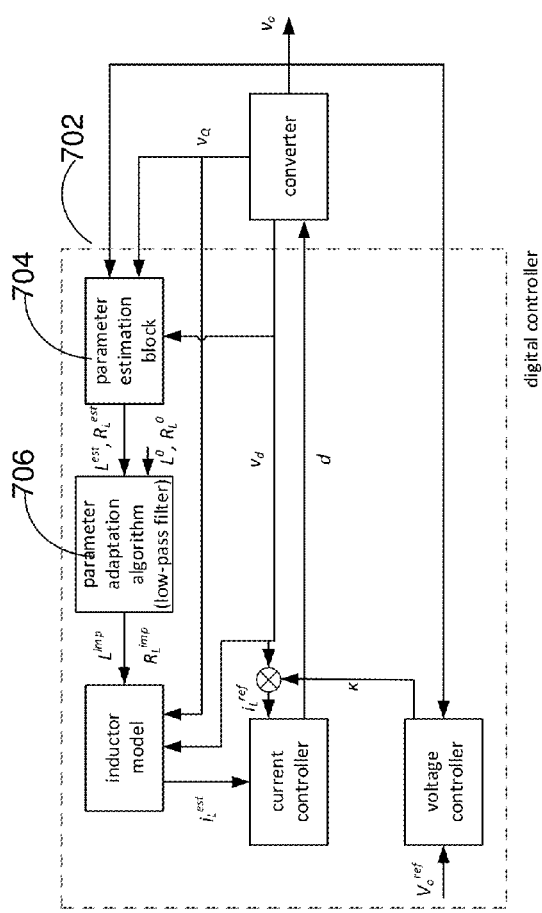
FIGS. 7A-7B illustrate inductor model based current estimation along with parameter adaptation, and low pass filtering of estimated inductance for inductor model, respectively.
Figure 7B:
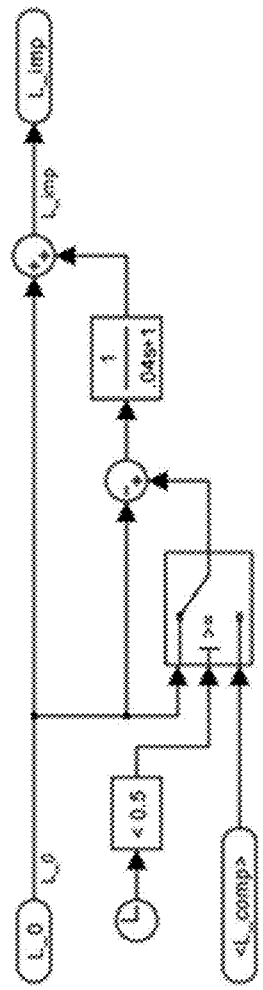

FIG. 7A illustrates a convertor with a digital control system 702. Once the parameters $R_L^{est}$ and $L^{est}$ have been estimated using (18)-(20) in a parameter estimation block 704 they are first passed through a low pass filter 706 to smooth out the estimates that are updated every line half cycle. The low pass filter 706 will also prevent any disturbance this update procedure may cause to the voltage control loop. Suitable time constants for the filters were found to be 40 ms through simulation for the adaptation of both L and $R_L$. At the start of the simulation, the inductor model uses pre-assigned values of $L^0$, $R_L^0$ as the initial values of the low-pass filter. Once the converter reaches steady state, the parameter adaptation is activated after 0.5 s. The inductor model then uses $L^{imp}$, $R_L^{imp}$ as the parameters. The SIMULINK model used to implement the scheme for the inductance is shown in FIG. 7B. Until 0.5 s, the relay block selects $L^0$ which gets subtracted from itself. The input to low pass filter block is thus zero. Therefore the output from the low pass filter, which is also zero, when added to $L^0$ makes $L^{imp}=L^0$ (given as 'L_0' and 'L_imp' in FIG. 7B. After 0.5 s, $L^{est}$ (given as 'L_comp' in FIG. 7b) is selected by the relay causing $L^{imp}$ to reach $L^{est}$ after the time delay imposed by the low pass filter. An identical block computes $R_L^{imp}$. The equations for $L^{imp}$ and $R_L^{imp}$ are shown in (23) and (24) respectively.

$$L^{imp} = \begin{cases} L^0 & \text{for } t \leq 0.5s \\ L^0 e^{-0.04(t-0.5)} + L^{est}\{1 - e^{-0.04(t-0.5)}\} & \text{for } t > 0.5s \end{cases} \quad (23)$$

$$R_L^{imp} = \begin{cases} R_L^0 & \text{for } t \leq 0.5s \\ R_L^0 e^{-0.04(t-0.5)} + R_L^{est}\{1 - e^{-0.04(t-0.5)}\} & \text{for } t > 0.5s \end{cases} \quad (24)$$

Figure 8A:
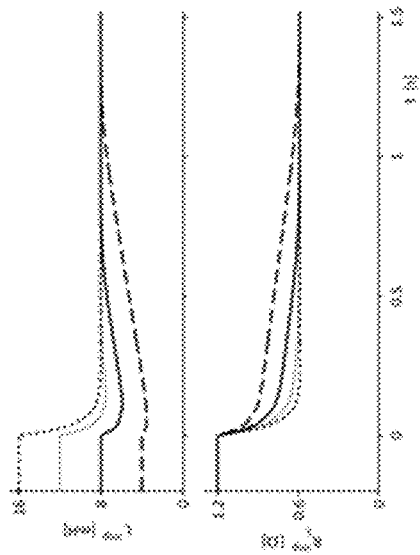
FIGS. 8A-8C illustrate (8A) parameter adaptation time for $L^0=16$ mH and various values of $R_L^0$ (left) and for $R_L^0=1.2\Omega$ and various values of $L^0$ (right), and (8B) parameter convergence trajectory for various initial values $L^0$ and $R_L^0$ in 2-D (left) and 3-D (right) with time, and (8C) steady state simulated input current for different values of $L^{imp}$ and $R_L^{imp}$.
Figure 8A:
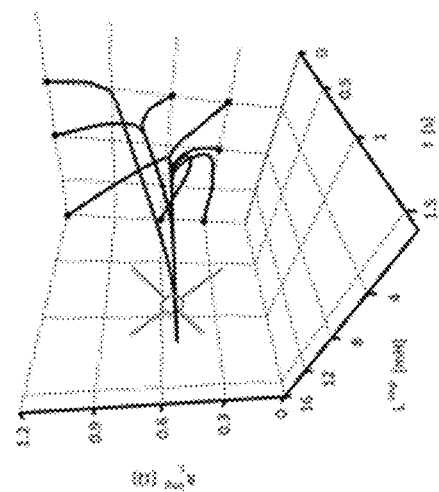
Figure 8B:
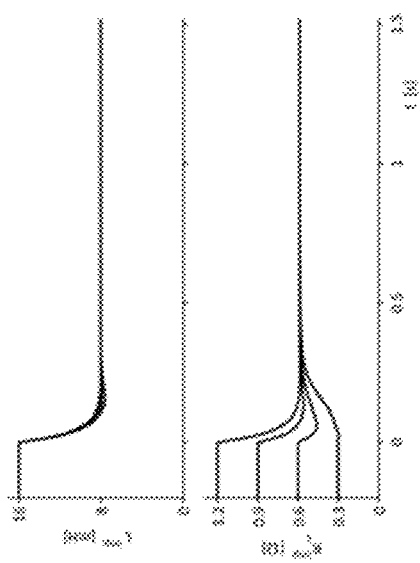
Figure 8B:
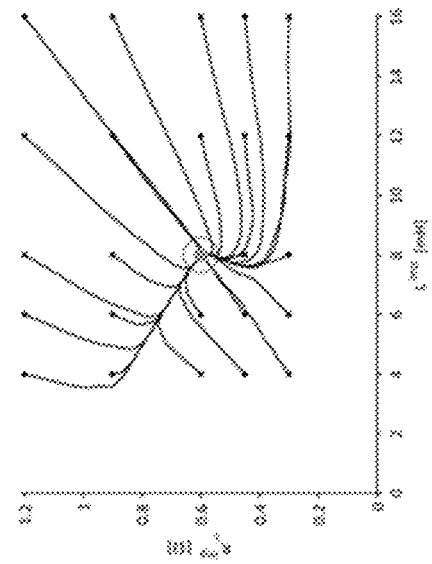

The stability and the time required for convergence of the adapted parameters were investigated next. FIG. 8A shows the adaptation convergence time for various values of $R_L^0$ for a fixed value of $L^0$ and also for various values of $L^0$ for a fixed value of $R_L^0$. It is seen that higher these initial values are, the shorter is the time for adaptation. Also the final adapted values of the parameters converged very closely to the true value of the inductor. For example, for the results shown in FIG. 8A these parameters converged to 8.025 mH and 0.59Ω after 1.5 s of simulation when the true values were 8 mH and 0.6Ω. FIG. 8B describes the convergence trajectories both in 2-D and 3-D (with time) for the various $R_L^0$ and $L^0$ values. The gray circles in the middle of these plots depict the true parameters.

Figure 8C:
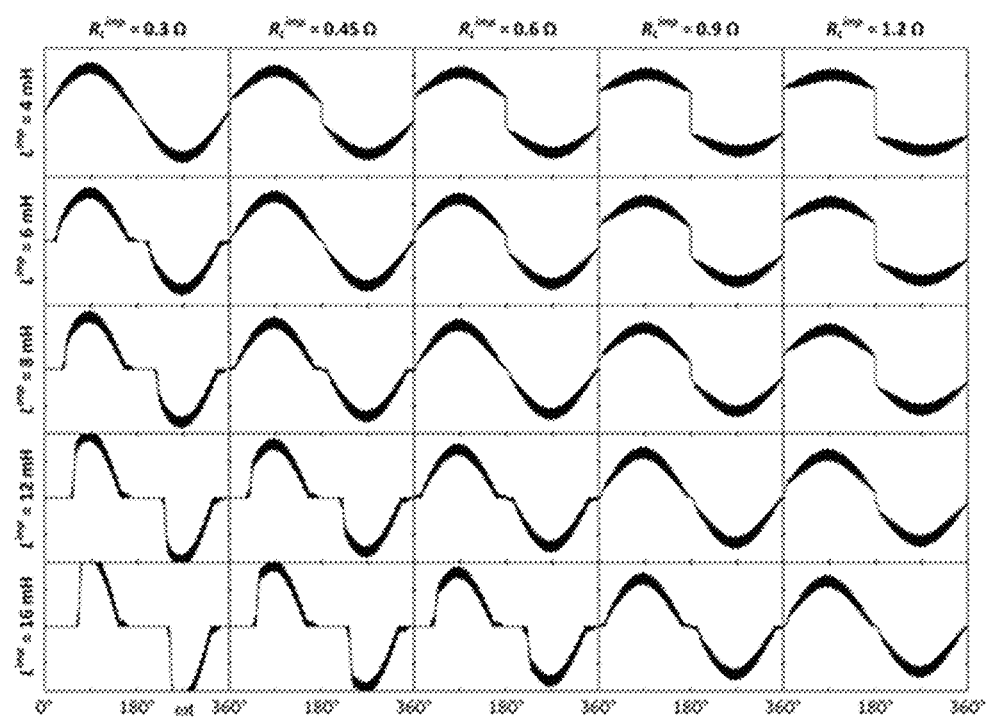

The need for parameter estimation and adaptation can be understood from the plot matrix presented in FIG. 8C. Without parameter estimation and adaptation, as the time constant $\tau^{imp}=L^{imp}/R_L^{imp}$ increased from the true value 8 mH/0.6Ω=13.33 ms, the input current waveforms in the lower triangular elements become more peaked in nature. However the more $\tau^{imp}$ decreased below its true value of 13.33 ms, the more it looks like a square wave, as can be seen from the upper triangular elements of the plot matrix. Thus from the point of peak current rating of the power devices it is best to start with the lowest possible initial value of $L^{imp}$ and the highest possible initial value of the resistance $R_L^{imp}$. This however will increase the parameter convergence time as discussed earlier. It is also noted from the diagonal elements of FIG. 8(c) that regardless of the initial value of $L^{imp}$ and $R_L^{imp}$, the steady state current waveforms are identical as long as the time constant $\tau^{imp}$ matches the true value; meaning that the control loop corrects for any error in the estimation of L as pointed out earlier. This was also verified by noting the different values of κ in Table III for incorrect values $L^{imp}$ and $R_L^{imp}$ but the correct value $\tau^{imp}$. As $L^{imp}$ changes, κ changes too, such that the product κ·$L^{imp}$ is maintained constant.

TABLE III

Different values of voltage controller output for the correct value of $\tau^{imp}$ = 13.33 ms but incorrect values of $L^{imp}$ and $R_L^{imp}$. The voltage controller output κ changes such that the product κ · $L^{imp}$ remains constant in order to keep $i_L^{est} \equiv i_L^{ref}$.

| $L^{imp}$ [mH] | $R_L^{imp}$ [Ω] | $\frac{L^{imp}}{R_L^{imp}}$ [ms] | κ $\left[\frac{A}{V}\right]$ | κ · $L^{imp}$ [s] |
|---|---|---|---|---|
| 4 | 0.3 | 13.33 | 0.028 | 112 · 10⁻⁶ |
| 6 | 0.45 | 13.33 | 0.019 | 112 · 10⁻⁶ |
| 8 | 0.6 | 13.33 | 0.014 | 112 · 10⁻⁶ |
| 12 | 0.9 | 13.33 | 0.0092 | 111 · 10⁻⁶ |
| 16 | 1.2 | 13.33 | 0.0069 | 110 · 10⁻⁶ |

D. Experimental Results

Figure 9:
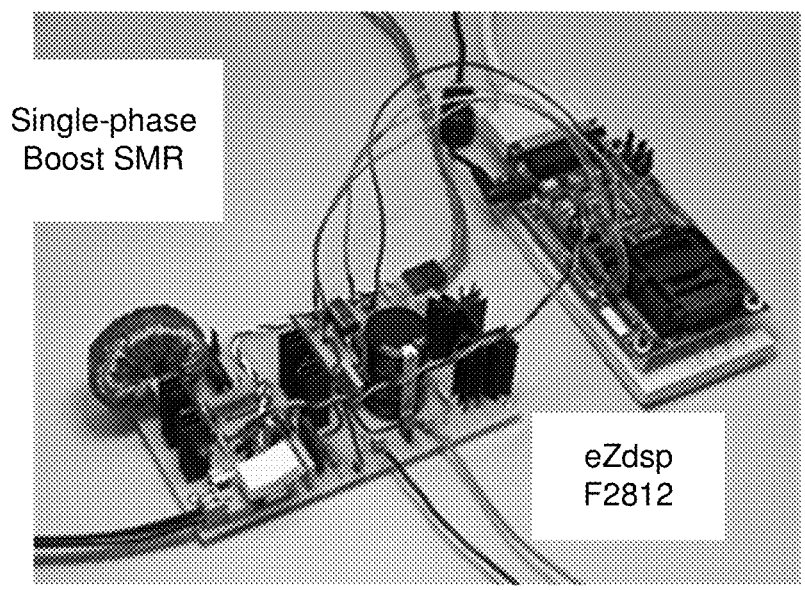
FIG. 9 illustrates hardware setup.

A single-phase boost topology based SMR circuit, similar to the one simulated, was built in the laboratory. A digital signal controller (DSC) TMS320F2812 from Texas Instruments [30] embedded on an evaluation board eZdsp F2812 from Spectrum Digital [31, 32] was used for controlling and parameter adaptation of the boost inductor. FIG. 9 shows the hardware setup. The TMS320F2812 controller is meant primarily for motor drives application and has a low clock speed. It also uses fixed point arithmetic. Further, to improve accuracy and precision of the estimated current and hence the THD of the input current, $v_d$, $v_Q$ and $v_o$ were sampled 40 times within one switching cycles. These factors limited the switching frequency of the converter to 20 kHz as significant real time computations are also involved for determining the duty cycle. For higher switching frequency either a floating point controller or one with higher clock speed should be used. Alternatively, the method used in [26] can be followed whereby the average inductor voltage $v_{L,av}[k]$ for every $k^{th}$ switching cycle is computed as in (25) using the corresponding values of input and output voltages $v_d[k]$ and $v_o[k]$ respectively and the duty cycle $d[k]$. $v_{L,av}[k]$ is then used to compute the inductor current. This will eliminate the need of sampling $v_Q$ and large number of samples within one switching cycle.

$$v_{L,av}[k]=v_d[k]-(1-d[k])v_o[k] \quad (25)$$

However, [26] reported an accuracy of 6% or better using a maximum sampling rate of 8 times switching frequency. With the procedure followed for the work presented here, the maximum inaccuracy in estimating the transition point of $v_Q$ is only $$\left(\frac{1}{40}\right)*100\% = 2.5\%.$$

To avoid errors due to analog-to-digital conversion in measuring the peak of the output voltage ripple $\hat{V}_{o,rip}^{mes}$, to estimate $\hat{I}_L^{est}$, the peak of inductor current, the following technique was used. Neglecting higher order harmonics in the output ripple except the second, the output can be approximated as $$v_o \approx V_o - \hat{V}_{o,rip} \sin 2\omega t \quad (26)$$

Then, $$\hat{V}_{o,rip} = \frac{\omega}{2}\left[\int_{T/4}^{T/2}(v_o - V_o)dt - \int_0^{T/4}(v_o - V_o)dt\right], T = \frac{2\pi}{\omega} \quad (27)$$

where $V_o$ is the average value of the output voltage. Equation (27) can be used with $V_0^*$, the output voltage reference instead of $V_0$. This way, it is not necessary to find $V_0$. If, because of a small regulation error, the actual output voltage differs slightly from its reference, both integrals in (27) are equally affected and the subtraction eliminates the impact on the result.

The controllers given by (22) were implemented in the digital domain using bilinear transformation [33].

The converter initially used a boost inductor made with type 40 powdered iron core material [34]. The type 40 material has considerable nonlinearity and hysteresis as shown by the B-H curve in FIG. 10A. At first the inductor parameters were estimated through trial and error by comparing the measured current with the computed current as the nominal values of inductor parameters did not produce satisfactory results. However when computed current feedback was used instead of measured current feedback as shown in FIG. 11, the actual current waveform was distorted. For example, the regions $\theta_1$ and $\theta_2$ in the second quarter cycle of the current waveform deviated considerably from the expected sinusoidal nature. Such behaviour can occur if the inductor is nonlinear, that is, if the core has a nonlinear relationship between magnetic field strength, H and magnetic flux density, B. All ferromagnetic materials exhibit some degree of saturation and hysteresis. To circumvent this problem, an inductor made out of type 2D powdered iron core material [34], whose B-H curve shows (FIG. 10B) more linearity and less hysteresis, was tried. However, the relative permeability of the type 2D core is lower and hence it required a larger core and more number of turns to build the inductor. This increased the overall cost and size of the inductor. It should however be possible to optimize the inductor design using other core materials such as gapped ferrites, but it was not pursued at this point of time as the objective of this work is different. FIGS. 12A-12B show the improvement in the estimated current with the changed inductor. Incidentally, in order to improve the THD, a sine wave generated by the controller and synchronized with the utility voltage was used as current reference.

Figure 14A:
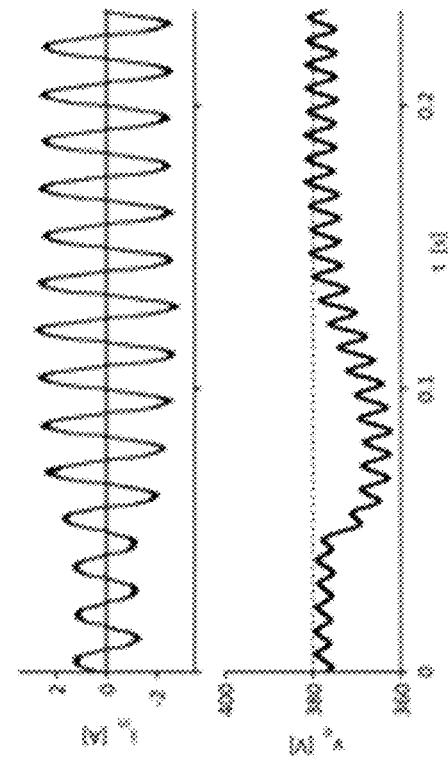
FIGS. 14A-14B illustrate step change from half load to full load with measured current feedback, and computed current feedback using the improved inductor, respectively.
Figure 14B:
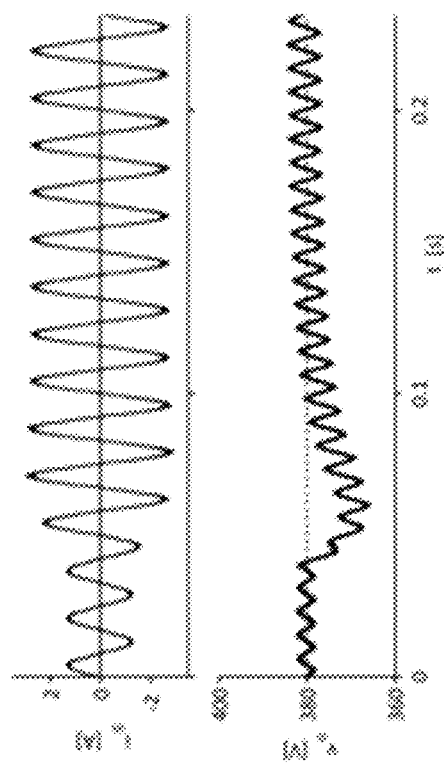

Subsequently, the transient behaviour of the scheme was tested using the improved inductor. FIG. 13A-13B compare the performance of the sensorless current feedback with a resistor-based measured current feedback when load was changed from full load to half load. FIGS. 14A-14B compare the performance of the two schemes when load was changed from half load to full load. Except for very slight increase in transient response time with the sensorless current feedback, the two schemes seem quite comparable. It is to be noted that parameter adaptation was disabled when these tests were performed to avoid its interference with the load transient.

Figure 15A:
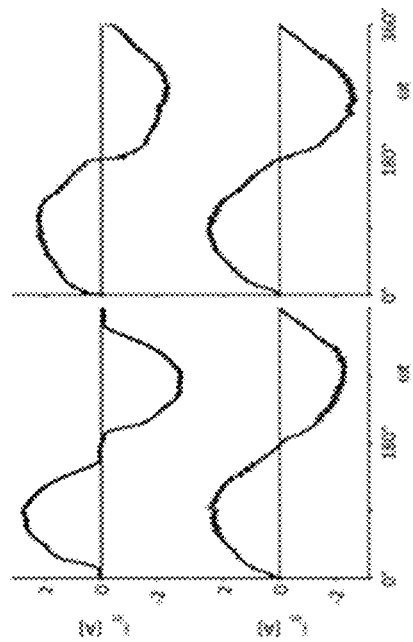
FIGS. 15A-15B illustrate $L^{est}$ (top) and $R_L^{est}$ (bottom) for 200 line half-cycles without model adaptation but controlled with computed current at rated load (201 W), and input current, before (top row) and after (bottom row) model adaptation at rated load, with $L^0=16$ mH, $R_L^0=0.9\Omega$, (left); with $L^0=6$ mH, $R_L^0=1.2\Omega$, (right), respectively.

Before the inductor model was made adaptive, i.e. $L^{est}$ and $R_L^{est}$ are used in determining $L^{imp}$ and $R_L^{imp}$ respectively, the estimated model parameters were inspected. To do this, the values from 200 line half-cycles were stored in the controller and then retrieved from the memory. These values are plotted in FIG. 15A for rated load when the computed inductor current was used for the current control. As can be seen the results are quite consistent and fall within a narrow band. Also both $L^{est}$ and $R_L^{est}$ follow similar trend. Hence they were deemed acceptable for parameter adaptation. Also the low-pass filters described in FIG. 4b help in filtering out much of the scattering and provide an averaged update. Table IV provides the results for the average value and standard deviation of $L^{est}$ and $R_L^{est}$ under different load conditions for values obtained from 200 line half cycles.

TABLE IV

Average values and standard deviations of $L^{est}$ and $R_L^{est}$ under different load conditions for values obtained from 200 line half cycles.

| $P_o$ | $L_{av}^{est}$ [mH] | $\frac{\sigma_L}{L_{av}^{est}}$ | $R_{L,av}^{est}$ [Ω] | $\frac{\sigma_{R_L}}{R_{L,av}^{est}}$ |
|---|---|---|---|---|
| 201 W | 6.40 | 9.0% | 1.32 | 10.9% |
| 151 W | 6.01 | 14.9% | 1.37 | 15.9% |
| 101 W | 5.68 | 12.8% | 1.48 | 13.2% |
| 51 W | 4.90 | 19.3% | 1.21 | 15.5% |

Figure 15B:
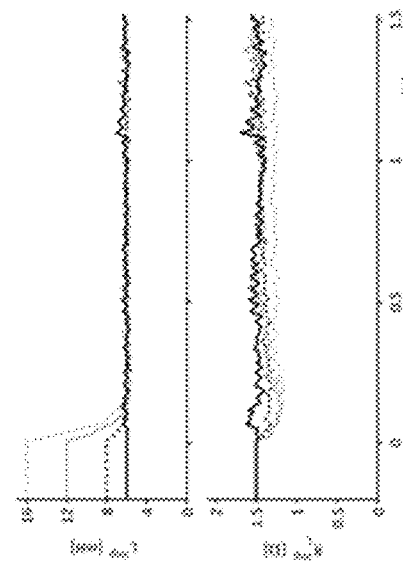

FIG. 15B shows the effect of the model adaptation on the input current for two cases of initial parameters. It shows the input current waveforms before and after the inductor model is adapted. Comparing them with FIG. 8C readily reveals that with $L^0=16$ mH and $R_L^0=0.9\Omega$, $$\tau^0 = \frac{L^0}{R_L^0}$$

is above the actual value whereas with $L^0=6$ mH, $R_L^0=1.2\Omega$ it is below the actual one.

Figure 16A:
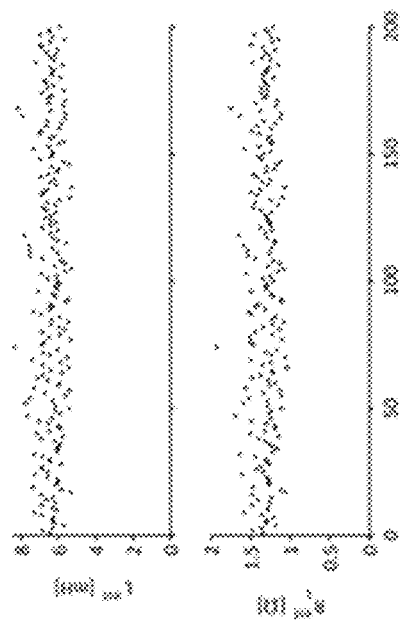
FIGS. 16A-16B illustrate an inductor model parameter adaptation for $L^0=16$ mH and various values of $R_L^0$, (6A); and $R_L^0=1.5\Omega$ various values of $L^0$, (6B).
Figure 16B:
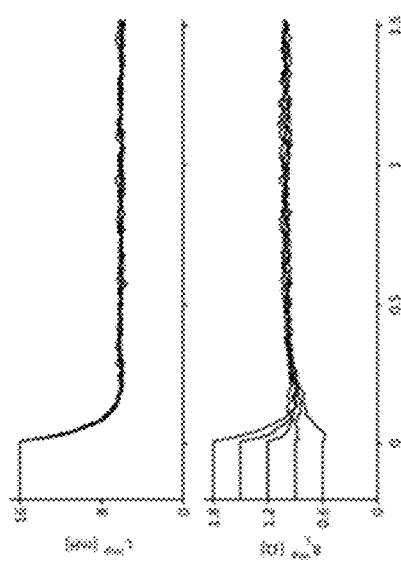
Figure 17A:
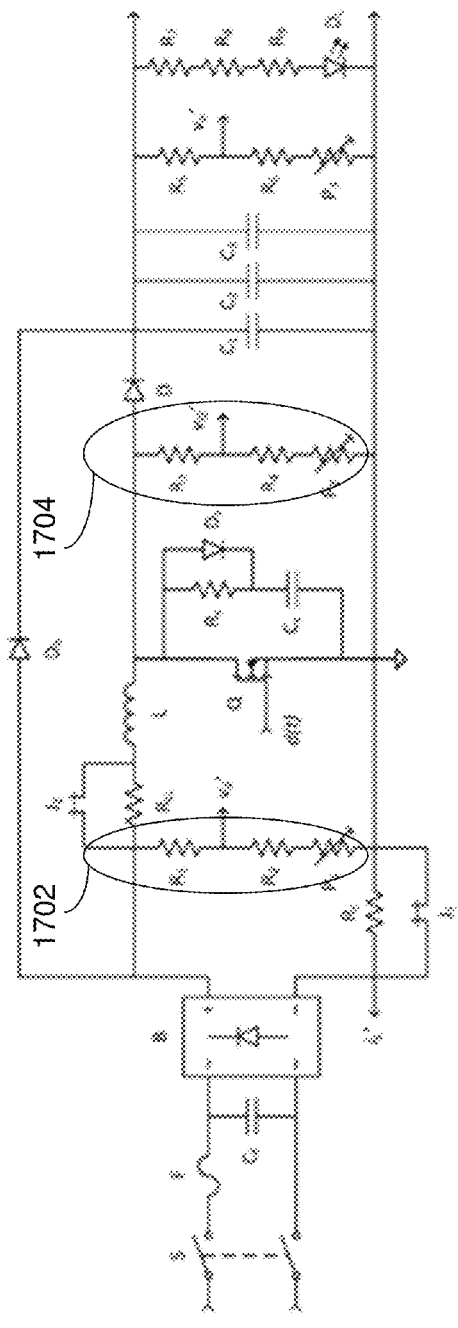
FIG. 17A illustrates a boost convertor circuit.
Figure 17C:
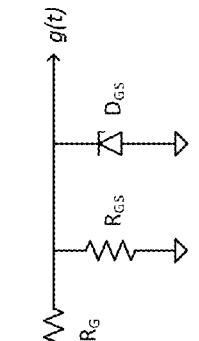
FIGS. 17B-17C illustrate amplifier/buffer circuits for voltage measurement and switch transistor control.
Figure 17B:
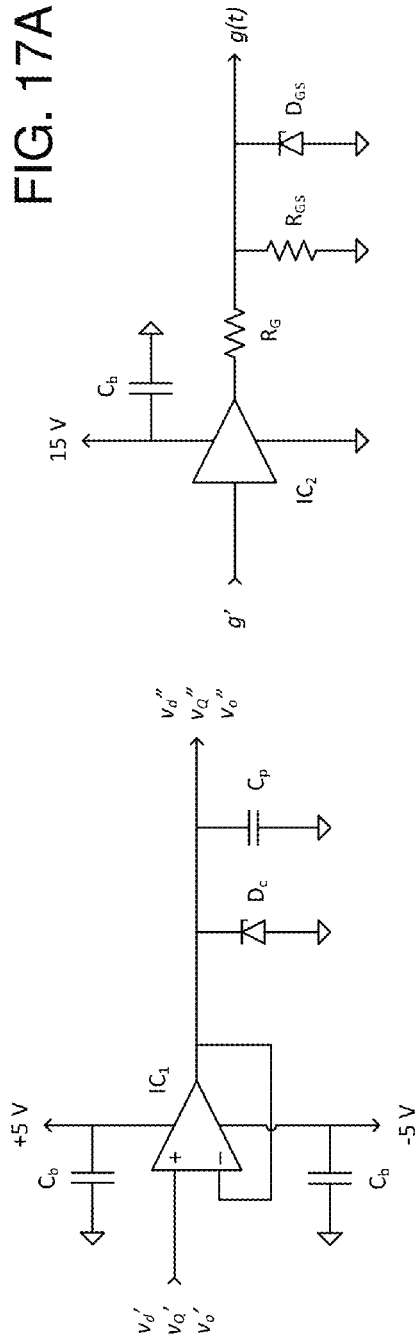
Figure 18:
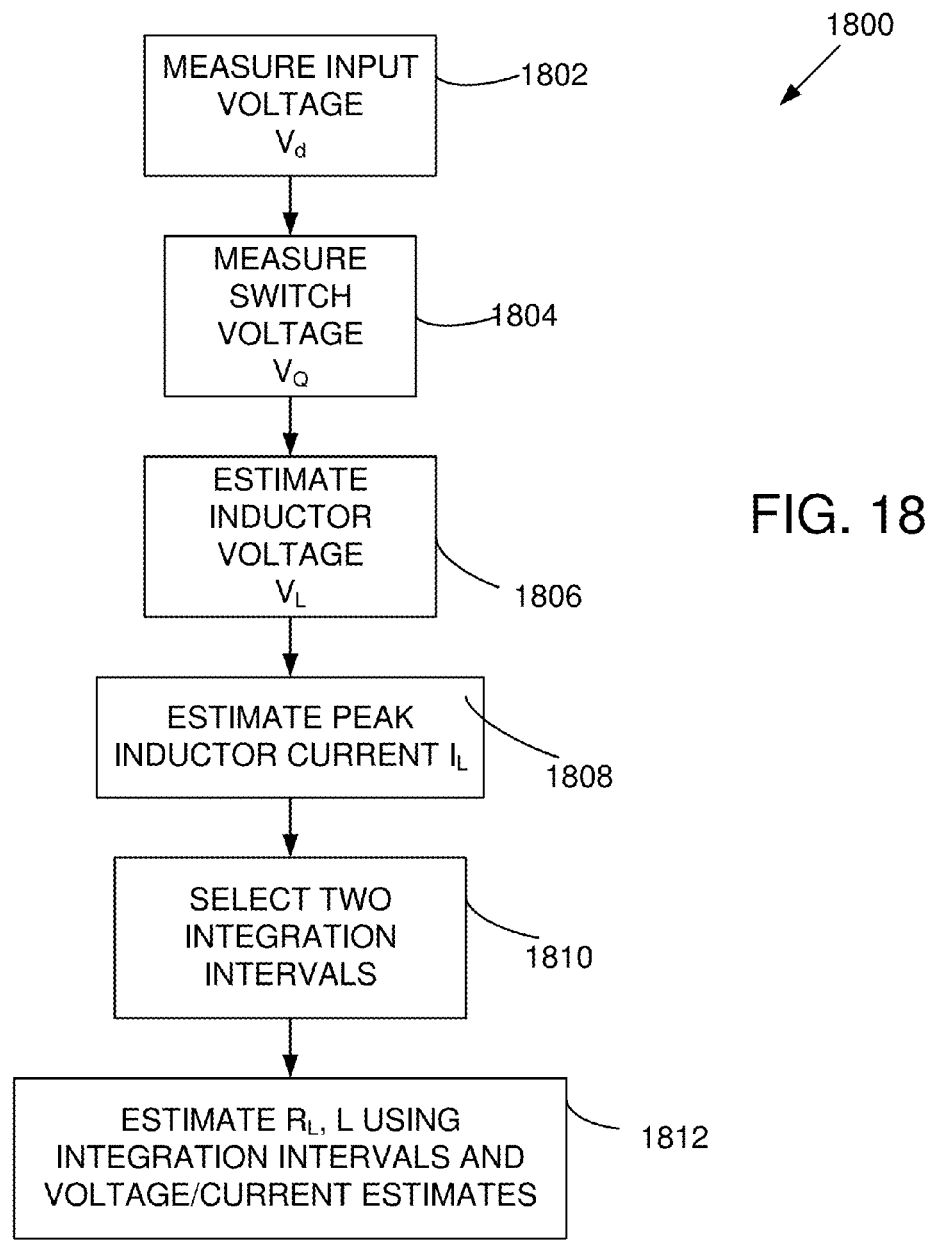
FIG. 18 illustrates a representative method of estimating inductor resistance and inductance.

FIGS. 16A-16B show $L^{imp}$ and $R_L^{imp}$ with respect to time for different initial values. After the adaptation is turned on at t=0, the implemented parameters asymptotically approach the estimated values. These results are close to the ones obtained through simulation and plotted in FIG. 8A. However the dependence of convergence time on the initial $L^0$ seems much less. One reason could be the inductor's temperature rise which increased $R_L$. When $L^0$ was set to values less than 6 mH, the current control became unstable and large oscillations occurred in the input current. In all other tested cases, the model adaptation converges to around 6.1 mH and between 1.3 and 1.5Ω. A possible workaround to avoid the instability is to use a value of $L^0$ larger than the nominal value such that this situation is avoided. The control is more robust and the THD is less when $L^0$ has a larger value.

Table V lists the comparative THD results between simulated and experimental results with measured current feedback and estimated current feedback with and without parameter estimation with two sets of $L^0$ and $R_L^0$. Table VI lists THD values at other loads only with parameter adaptation. The results clearly show that parameter adaptation is very important for improvement of THD and hence power factor.

Finally, the efficiency was also tested at various load levels with the scheme as shown in Table VII. The calculation did not include the power fed to the auxiliary power supply (in the order of mW) and the power for the digital controller board.

TABLE V

Comparison of low-order harmonics of the input current as % of the fundamental and its THD for simulation, control with measured current and control with estimated current before and after model adaptation at rated load.

| harmonic | 2 | 3 | 5 | 7 | 9 | 11 | THD |
|---|---|---|---|---|---|---|---|
| simulated | 0 | 1.6 | 0.6 | 0.6 | 0.5 | 0.5 | 2% |
| control with measured current | 0 | 2.0 | 1.8 | 0.4 | 0.6 | 1.4 | 3% |
| control with estimated current before adaptation | 1 | 13.3 | 9.3 | 4.5 | 1.5 | 2.4 | 17% |

TABLE V-continued

Comparison of low-order harmonics of the input current as % of the fundamental and its THD for simulation, control with measured current and control with estimated current before and after model adaptation at rated load.

| harmonic | | 2 | 3 | 5 | 7 | 9 | 11 | THD |
|---|---|---|---|---|---|---|---|---|
| $L^0$ = 16 mH | after | 4 | 2.0 | 2.8 | 1.7 | 0.6 | 1.2 | 4% |
| $R_L^0$ = 0.9 Ω | adaptation | | | | | | | |
| control with | before | 3 | 12.2 | 8.5 | 4.4 | 1.7 | 2.1 | 15% |
| estimated current | adaptation | | | | | | | |
| $L^0$ = 6 mH | after | 0 | 3.8 | 3.1 | 2.3 | 1.1 | 0.9 | 6% |
| $R_L^0$ = 1.2 Ω | adaptation | | | | | | | |

TABLE VI

Low-order harmonics of the input current as % of the fundamental and its THD after model adaptation at various load levels.

| harmonic | | 2 | 3 | 5 | 7 | 9 | 11 | THD |
|---|---|---|---|---|---|---|---|---|
| $L^0$ = 16 mH | $P_o$ = 150 W | 1 | 2.1 | 2.5 | 1.5 | 0.6 | 1.0 | 4% |
| $R_L^0$ = 0.9 Ω | $P_o$ = 100 W | 3 | 3.2 | 2.2 | 2.3 | 0.9 | 2.2 | 6% |
| | $P_o$ = 50 W | 3 | 13.5 | 7.6 | 4.6 | 1.5 | 3.1 | 17% |
| $L^0$ = 6 mH | $P_o$ = 150 W | 4 | 3.9 | 1.8 | 1.6 | 1.0 | 1.2 | 5% |
| $R_L^0$ = 1.2 Ω | $P_o$ = 100 W | 9 | 5.7 | 2.8 | 1.7 | 1.3 | 1.5 | 7% |

TABLE VII

Converter efficiency at various loads

| $P_o$ | 198 W | 150 W | 100 W | 50 W |
|---|---|---|---|---|
| η | 0.94 | 0.92 | 0.91 | 0.86 |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A digital power supply controller, comprising:
a logic device, having computer executable instructions defined therein for performing a method comprising:
receiving a measurement corresponding to a switch voltage associated with a switch device and a measurement of a rectified input voltage, and based on the switch voltage and the rectified input voltage, estimating a resistance and inductance of a boost inductor;
estimating a current in the inductance based on the estimated resistance and inductance;
determining a control signal for the switch device based on the estimated current;
estimating a magnitude of a periodic boost inductor current based on an output voltage ripple;
estimating the resistance and the inductance of the boost inductor based on the estimated magnitude of the periodic boost inductor current, wherein the resistance and inductance of the boost inductor are estimated based on integration of the relation $$v_L^{est} = R_L^{est} i_L^{est} + L^{est} \frac{d i_L^{est}}{dt}$$

over at least two different time intervals, wherein $v_L^{est}$, $R_L^{est}$, $i_L^{est}$, $L^{est}$ are the estimated boost inductor voltage, the estimated boost inductor resistance, the estimated boost inductor current, and the estimated boost inductor inductance, respectively; and
estimating the inductance of the boost inductor based on a difference between the measurement corresponding to the switch voltage associated with the switch device and the measurement of the rectified input voltage.

2. The digital power supply controller of claim 1, wherein the estimated boost current is periodic at an angular frequency ω.

3. The digital power supply controller of claim 2, wherein the estimated boost inductor current is expressed as $i_L^{est} = I_L^{est} \sin(\omega t + \phi)$, wherein $I_L^{est}$ is the estimated magnitude of the periodic boost inductor current and φ is an arbitrary phase.

4. The digital power supply controller of claim 3, wherein the at least two different time intervals include at least one of the intervals (0, π/ω) and (0, π/2ω).

5. The digital power supply controller of claim 3, wherein the at least two different time intervals differ by about ¼ of a period of the estimated boost inductor current.

6. A method, comprising:
estimating a boost inductor resistance and inductance based on measured voltages associated with a rectified input voltage and a switch voltage, wherein the resistance and inductance of the boost inductor are estimated based on integration of the relation $$v_L^{est} = R_L^{est} i_L^{est} + L^{est} \frac{d i_L^{est}}{dt}$$

over at least two different time intervals, wherein $v_L^{est}$, $R_L^{est}$, $i_L^{est}$, $L^{est}$ are the estimated boost inductor voltage, the estimated boost inductor resistance, the estimated boost inductor current, and the estimated boost inductor inductance, respectively;
based on the estimated inductor resistance and inductance, defining a control signal for a switching transistor; and
coupling the control signal to the switching transistor.

7. The method of claim 6, wherein the estimated boost inductor current is expressed as $i_L^{est} = I_L^{est} \sin(\omega t + \phi)$, wherein $I_L^{est}$ is the estimated magnitude of the periodic boost inductor current and ω is an angular frequency and φ is an arbitrary phase.

8. The method of claim 7, wherein the at least two different time intervals include at least one of the intervals (0, π/ω) and (0, π/2ω) or intervals that differ by ¼ period of the rectified input voltage.

* * * * *